(12) United States Patent
Ikeda (10) Patent No.: US 8,473,940 B2
(45) Date of Patent: Jun. 25, 2013

(54) COMMUNICATION APPARATUS, DATA PROCESSING SYSTEM, CONTROL METHOD FOR COMMUNICATION APPARATUS, CONTROL METHOD FOR DATA PROCESSING SYSTEM, AND PROGRAM THEREFOR

(75) Inventor: Atsushi Ikeda, Tokorozawa (JP)

(73) Assignee: Canon Kabushiki Kaisha (JP)

( * ) Notice: Subject to any disclaimer, the term of this patent is extended or adjusted under 35 U.S.C. 154(b) by 1062 days.

(21) Appl. No.: 12/121,197

(22) Filed: May 15, 2008

(65) Prior Publication Data

US 2008/0288936 A1 Nov. 20, 2008

(30) Foreign Application Priority Data

May 16, 2007 (JP) ................................. 2007-130580

(51) Int. Cl.
*G06F 9/44* (2006.01)

(52) U.S. Cl.
USPC ............................ 717/173; 717/168; 717/169

(58) Field of Classification Search
USPC .................. 717/173, 168–169; 358/1.15, 1.14
See application file for complete search history.

(56) References Cited

U.S. PATENT DOCUMENTS

| 2002/0091807 A1* | 7/2002 | Goodman | 709/221 |
| 2003/0035139 A1* | 2/2003 | Tomita et al. | 358/1.15 |
| 2006/0221684 A1* | 10/2006 | Iwai | 365/185.03 |
| 2008/0253384 A1* | 10/2008 | Noro et al. | 370/401 |

FOREIGN PATENT DOCUMENTS

JP 2006-178751 A 7/2006

\* cited by examiner

*Primary Examiner* — Chat Do
*Assistant Examiner* — Lynda Dinh
(74) *Attorney, Agent, or Firm* — Rossi, Kimms & McDowell LLP (57) ABSTRACT

A communication apparatus that, when distributing data to a plurality of apparatuses, enable use of the data distributed to each of the plurality of apparatuses without being bound by a prescribed time as in the prior arts. Control is provided so as not to execute at least one portion of functions among a plurality of functions that are executable by a communication apparatus until it is determined that update processing of control data for controlling the communication apparatus based on an update data is completed and control data that is stored in an another communication apparatus has been updated with the update data.

10 Claims, 11 Drawing Sheets

| | | | |
|---|---|---|---|
| 400 | | | |
| 410 | Node1 | NODE IDENTIFIER | 192.168.0.1(255.255.255.0) — 411 |
| | | VERSION INFORMATION | Main:01.00,Print:01.04,Scan:01.08,Copy:01.00 — 412 |
| | | P2P PARTICIPATION STATUS | PARTICIPATING — 413 |
| | | NODE INFORMATION UPDATE TIME | 2006.12.24 20:54:05.293 — 414 |
| 420 | Node2 | NODE IDENTIFIER | 192.168.0.2(255.255.255.0) |
| | | VERSION INFORMATION | Main:01.00,Print:01.04,Scan:01.08,Copy:01.00 |
| | | P2P PARTICIPATION STATUS | PARTICIPATING |
| | | NODE INFORMATION UPDATE TIME | 2006.12.24 20:54:05.532 |
| NODE LIST | ... | ... | ... |
| 430 | Node12 | NODE IDENTIFIER | 192.168.3.2(255.255.255.0) |
| | | VERSION INFORMATION | Main:01.00,Print:01.04,Scan:01.08,Copy:01.00 |
| | | P2P PARTICIPATION STATUS | PARTICIPATING |
| | | NODE INFORMATION UPDATE TIME | 2006.12.24 20:54:06.917 |

| FIRMWARE UPDATE GUIDANCE | UPDATE GUIDANCE NODE | 192.168.0.1(255.255.255.0) | 701 |
| --- | --- | --- | --- |
| | DISTRIBUTION MODULE | Print | 702 |
| | VERSION | Print:01.05 | 703 |
| | RESTRICTION TARGET NODES | SAME SUBNET | 704 |
| | RESTRICTION TARGET FUNCTION(S) | Print,Copy | 705 |

COMMUNICATION APPARATUS, DATA PROCESSING SYSTEM, CONTROL METHOD FOR COMMUNICATION APPARATUS, CONTROL METHOD FOR DATA PROCESSING SYSTEM, AND PROGRAM THEREFOR

BACKGROUND OF THE INVENTION

1. Field of the Invention

The present invention relates to a communication apparatus, a data processing system, a control method for the communication apparatus, a control method for the data processing system, and a program therefor that are applied to a case of restricting use of data in accordance with a distribution status when distributing data to a plurality of apparatuses.

2. Description of the Related Art

Systems are already known which make use of peer-to-peer (hereunder, referred to as "P2P") communication technology in which a plurality of apparatuses connected to a network are in a equivalent relationship to enable the apparatuses to distribute firmware or resources to each other (for example, see Japanese Laid-Open Patent Publication (Kokai) No. 2006-178751). By utilizing this technology it is possible to perform en-bloc updating of firmware or data such as font data of a plurality of apparatuses connected to a closed network such as an intranet. Consequently, work to update firmware and the like can be performed without a network administrator or service representative going around to individual apparatuses.

As a different technology to the foregoing, the following server/client type system is also known. More specifically, the system is one in which each client periodically checks the version of resources or firmware stored on a server, and downloads firmware or resources from the server as necessary.

However, according to the above described prior arts, when operations using the relevant firmware are restarted in order from apparatuses at which updating of the firmware is completed while in the middle of updating the firmware of a plurality of apparatuses, there is a possibility that the following kinds of adverse effects will arise.

As a specific example, in a case in which firmware that changes a logic for color correction, e.g. calibration logic is being distributed to a plurality of apparatuses, if apparatuses that have a different calibration logic are mixed, there is a possibility that the tints of the respective apparatuses will vary.

A similar problem to that of firmware distribution also arises when distributing font data. More specifically, a case can be considered in which apparatuses with differing font data are mixed, and consequently a printing result will differ at respective apparatus.

The situation is the same with respect to dedicated application programs (hereunder, referred to simply as "applications") that operate on an apparatus. As a specific example, a case is assumed of using a dedicated application that counts and analyzes charge information in accordance with a number of print sheets for a plurality of apparatuses that are connected to a closed network. In this case, when different versions of the application are running at the same time, there is a possibility that differences will arise in the charge results.

Restricting use of the new firmware or application program until a prescribed time may be considered as a method to prevent differing firmware versions or differing versions of application programs being mixed among a plurality of apparatuses.

In that case, however, there is the problem that even though new firmware has been received by an apparatus, the apparatus cannot restart with the new firmware until a prescribed time. Further, unless updating of the firmware at all of the apparatuses is completed by the prescribed time, it is not possible to avoid the above described problem caused by mixing different versions of firmware (in the case of image forming apparatuses, the problem relates to variations among tints).

To avoid this situation, it is necessary to set the prescribed time with adequate leeway with regard to the time required by a plurality of apparatuses to update firmware. More specifically, according to the prior arts, unless a sufficient amount of time has elapsed since the start of firmware distribution, the new firmware cannot be used.

SUMMARY OF THE INVENTION

The present invention provides a communication apparatus that, when distributing data to a plurality of apparatuses, enable use of the data distributed to each of the plurality of apparatuses without being bound by a prescribed time as in the prior arts, and a data processing system, a control method for the communication apparatus, a control method for the data processing system, and a program therefor.

In a first aspect of the present invention, there is provided a communication apparatus comprising a storage unit adapted to store control data for controlling the communication apparatus, a control unit adapted to control the communication apparatus based on the control data stored in the storage unit, a first reception unit adapted to receive update data for updating the control data, a control data updating unit adapted to update the control data that is stored in the storage unit based on the update data received by the first reception unit, a second reception unit adapted to receive update status information indicating an update status of control data that is stored in another communication apparatus, and a determining unit adapted to determine whether or not the control data that is stored in the another communication apparatus has been updated with the update data based on the update status information that is received by the second reception unit, wherein the control unit is adapted to provide control so as not to execute at least one portion of functions among a plurality of functions that are executable by the communication apparatus until the determining unit determines that update processing of the control data by the control data updating unit is completed and the control data that is stored in the another communication apparatus has been updated with the update data.

According to the present invention, it is determined whether a plurality of communication apparatuses fulfill conditions for releasing a restriction relating to use of data, and the restriction relating to use of the data is released in accordance with the determination result. As a result, when distributing data to a plurality of apparatuses, it is possible to use data that has been distributed to each of the plurality of apparatuses without being bound to a prescribed time as in the conventional technology.

In a second aspect of the present invention, there is provided a communication system including a first communication apparatus and a second communication apparatus, comprising a distribution unit adapted to distribute update data for updating control data for controlling communication apparatuses to the first communication apparatus and the second communication apparatus, wherein the first communication apparatus comprises a storage unit adapted to store the control data for controlling the first communication apparatus, a control unit adapted to control the first communication apparatus based on the control data stored in the storage unit, a first reception unit adapted to receive the update data that is distributed by the distribution unit, a control data updating unit adapted to update the control data that is stored in the storage unit based on the update data received by the first reception unit, a second reception unit adapted to receive update status information indicating an update status of the control data that is stored in the second communication apparatus, and a determining unit adapted to determine whether or not the control data that is stored in the second communication apparatus has been updated with the update data based on the update status information that is received by the second reception unit, wherein the control unit is adapted to provide control so as not to execute at least one portion of functions among a plurality of functions that are executable by the first communication apparatus until the determining unit determines that update processing of the control data by the control data updating unit is completed and the control data that is stored in the second communication apparatus has been updated with the update data.

In a third aspect of the present invention, there is provided a method of controlling a communication apparatus having a storage unit adapted to store control data and a control unit adapted to control the communication apparatus based on the control data that is stored in the storage unit, comprising a first receiving step of receiving update data for updating the control data, a control data updating step of updating the control data that is stored in the storage unit based on the update data received in the first receiving step, a second receiving step of receiving update status information indicating an update status of control data that is stored in another communication apparatus, a determination step of determining whether or not the control data that is stored in the another communication apparatus has been updated with the update data based on the update status information that is received in the second receiving step, and a control step of providing control so as not to execute at least one portion of functions among a plurality of functions that are executable by the communication apparatus until it is determined in the determining step that update processing of the control data is completed in the control data updating step and the control data stored in the another communication apparatus has been updated with the update data.

Further features of the present invention will become apparent from the following description of exemplary embodiments with reference to the attached drawings.

DETAILED DESCRIPTION OF THE PREFERRED EMBODIMENTS

The present invention will now be described in detail with reference to the drawings showing preferred embodiments thereof.

It should be noted that the relative arrangement of the components, the numerical expressions and numerical values set forth in these embodiments do not limit the scope of the present invention unless it is specifically stated otherwise.

First Embodiment

Figure 1:
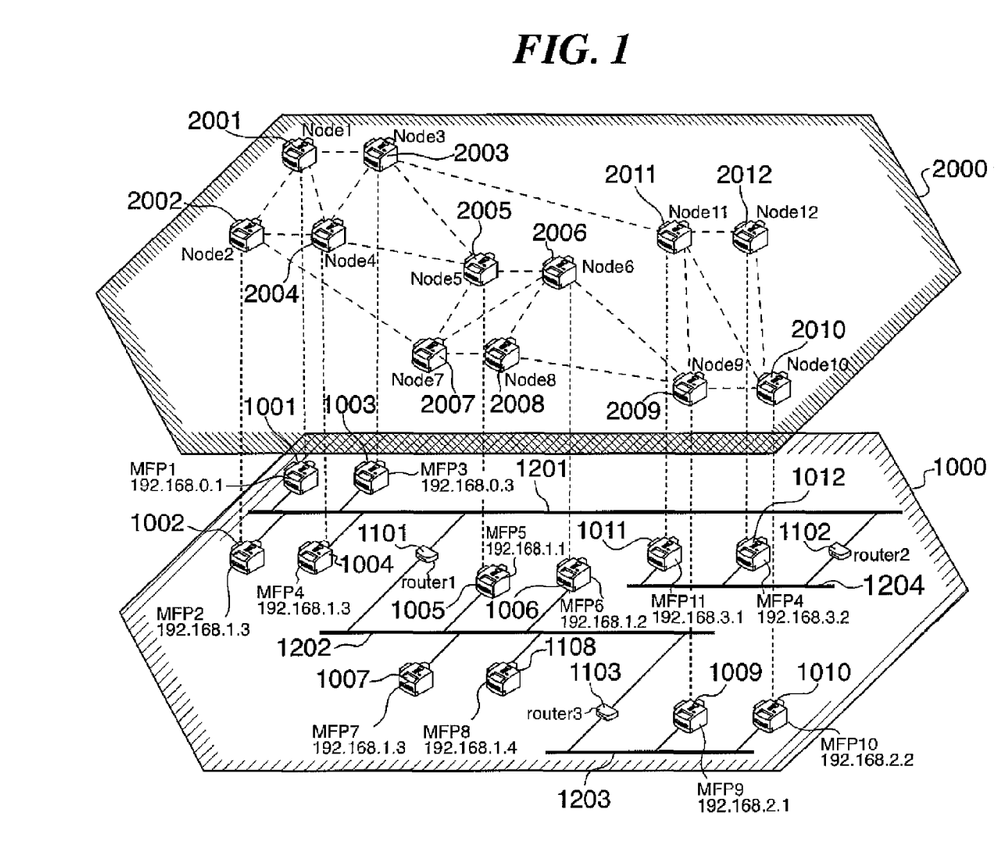
FIG. 1 is a schematic view showing a configuration example of a data processing system according to a first embodiment of the present invention.

FIG. 1 is a schematic view showing a configuration example of a data processing system according to the first embodiment of the present invention.

In FIG. 1, a data processing system comprises a plurality of apparatuses and routers. Hereunder, an MFP (Multi Function Peripheral) is described as one example of the apparatus. However, the apparatus is not limited to an MFP, and may be any communication apparatus that can communicate with an external apparatus.

The data processing system is configured as a system in which a plurality of MFPs are connected via a peer-to-peer network (hereunder, referred to as "P2P network"), and in which data distribution among the MFPs is possible. A firmware module may be given as one example of the data. The plurality of MFPs are connected by the P2P network.

FIG. 1 includes a view in a case where the data processing system is viewed from an IP network viewpoint, and a view in a case where the data processing system is viewed from a P2P network viewpoint. A topology 1000 shows the physical topology that is implemented in the IP network. Further, a topology 2000 shows the logical topology that is implemented in the P2P network.

The physical topology 1000 illustrates a state in which MFPs comprising an MFP 1 (1001) to an MFP 12 (1012) are connected through ether cables (1201 to 1204) and a router 1 (1101) to a router 3 (1103). In this connection, hereunder, when only the term "MFP" is used, the term refers to each of MFP 1 (1001) to MFP 12 (1012), and when only the term "router" is used, the term refers to each of router 1 (1101) to router 3 (1103).

The IP network is divided into four subnets through the routers. MFP 1 (1001), MFP 2 (1002), MFP 3 (1003), and MFP 4 (1004) belong to a first subnet. MFP 5 (1005), MFP 6 (1006), MFP 7 (1007), and MFP 8 (1008) belong to a second subnet. MFP 9 (1009) and MFP 10 (1010) belong to a third subnet. MFP 11 (1011) and MFP 12 (1012) belong to a fourth subnet.

In contrast, the logical topology 2000 illustrates a state in which nodes comprising a node 1 (2001) to a node 12 (2012) are connected by P2P communication as represented by the dashed line in the figure. Hereunder, the single term "node"

refers to each of the node 1 (2001) to the node 12 (2012). Since the logical topology 2000 illustrates a so-called overlap network, the entities denoted by the node 1 (2001) to the node 12 (2012) are MFP 1 (1001) to MFP 12 (1012). In this connection, in the following description, when emphasizing an apparatus under the P2P network the apparatus is referred to, in particular, as a "node", and at all other times the apparatus is referred to as an "MFP".

In the logical topology 2000, a dotted line denotes that a session is maintained between a certain node and a node that is adjacent (hereunder, referred to as an "adjacent node") to that node. A node takes the following nodes as adjacent nodes to itself: a node that the node in question accesses when participating in the P2P network; and an adjacent node that the node in question is informed of by that node which is accessed. The node in question maintains a session among those adjacent nodes.

Figure 2:
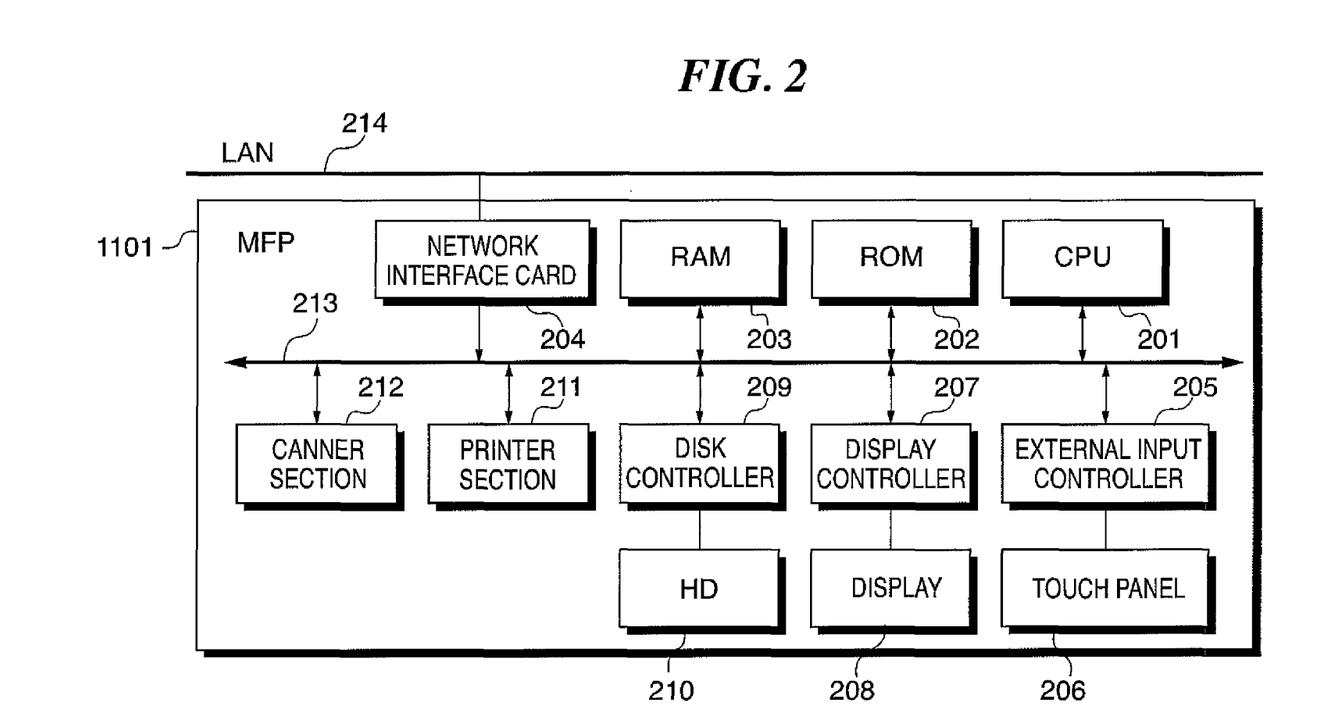
FIG. 2 is a block diagram showing the hardware configuration of an MFP shown in FIG. 1.

FIG. 2 is a block diagram showing the hardware configuration of the MFP 1001 in FIG. 1.

In FIG. 2, the MFP 1001 comprises a CPU 201, a ROM 202, a RAM 203, a network interface card (NIC) 204, an external input controller 205, and a touch panel 206. The MFP 1001 further comprises a display controller 207, a display 208, a disk controller 209, a hard disk (HD) 210, a printer section 211, and a scanner section 212.

The CPU 201 performs overall control of each device connected to a system bus 213, and also executes a firmware module stored in the ROM 202 or the HD 210 as a large-scale storage device. The firmware module comprises at least two modules, and updating of the firmware module can be performed for each module respectively.

The CPU 201 executes processing shown in each flowchart described later based on the firmware module as a control program. Depending on the case, the HD 210 may be used as a temporary storage location for images. The RAM 203 functions as a main memory and a work area of the CPU 201. The external input controller 205 controls instruction inputs from various buttons provided on the MFP or from the touch panel 206. The display controller 207 controls rendering with respect to the display 208. The network interface card 204 exchanges data with another MFP or a file server bidirectionally via a LAN 214. The printer section 211 performs image formation on a recording paper using an electrophotographic conversion method. The scanner section 212 reads an image that is printed on a recording paper. The scanner section 212 has an optional auto document feeder (not shown), and can automatically read a plurality of document sheets.

The present embodiment has the following features. Each MFP among a plurality of MFPs determines whether the plurality of MFPs fulfill a condition for releasing a restriction relating to use of data that is distributed. The restriction relating to use of the data is released in accordance with the determination result. Further, each of a plurality of MFPs determines whether the plurality of MFPs fulfill a condition for restricting use of data, and restrict use of the data while the plurality of MFPs fulfill the condition. In this case, a restriction relating to use of data is a restriction that inhibits operation of a specified function relating to the data. A detailed description thereof is provided later.

Figure 3:
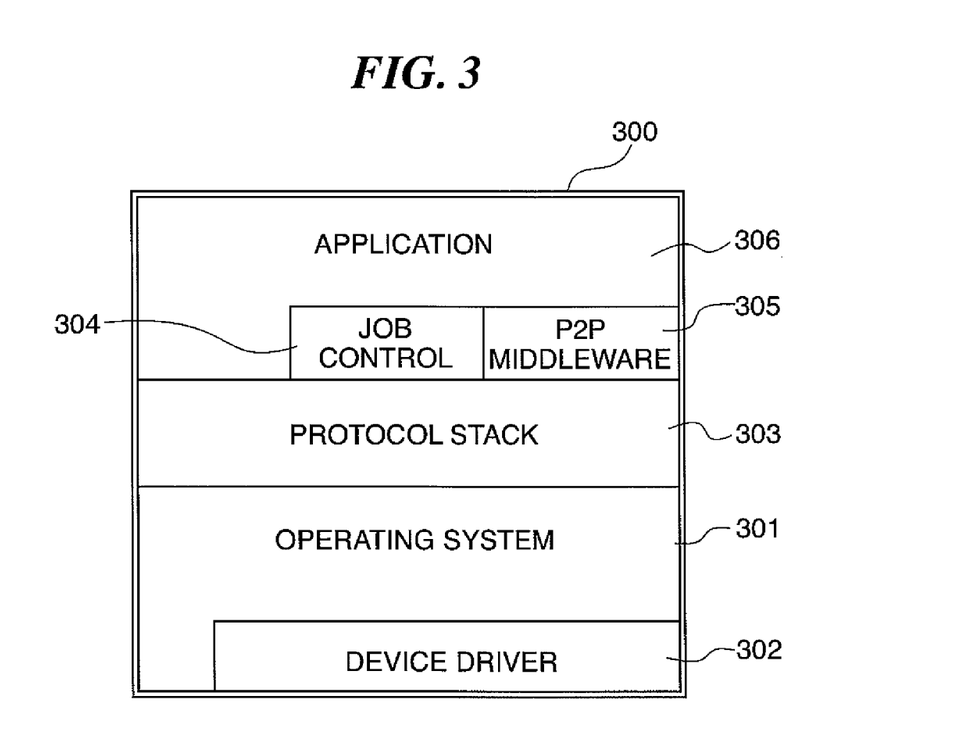
FIG. 3 is a view hierarchically showing a firmware configuration inside an MFP.

FIG. 3 is a view hierarchically showing the firmware configuration inside the MFP 1001.

In FIG. 3, reference numeral 300 denotes the entire firmware that controls the MFP 1001 that carries out P2P communication. An operating system 301 executes control and management of each device and application inside the MFP 1001. A device driver 302 executes control of each device described in FIG. 2. The network interface card 204 is also controlled by the device driver 302.

At a protocol stack 303, when the communication classification of data that the MFP 1001 receives from outside is P2P communication, the protocol stack 303 passes the received data to a P2P middleware 305 that controls P2P communication. The P2P middleware 305 performs control to maintain a connection for P2P communication. Metadata acquired using the P2P communication is conveyed to an application 306. Processing such as storing and managing the data is performed by the application 306.

In contrast, when the communication classification of data that the MFP 1001 receives from outside is a communication classification for image formation, the data is passed to a job control 304. Thereby, data is processed at an appropriate application layer to perform the intended job processing.

According to the firmware 300 of the present embodiment, the device driver 302 is modularized according to the device, such as the printer section 211 or the scanner section 212. The application 306 is also modularized for each function such as a printer function, a scanner function, and a copy function. Further, the firmware 300 is configured so that updating and restarting can be performed for each module.

Figure 4:
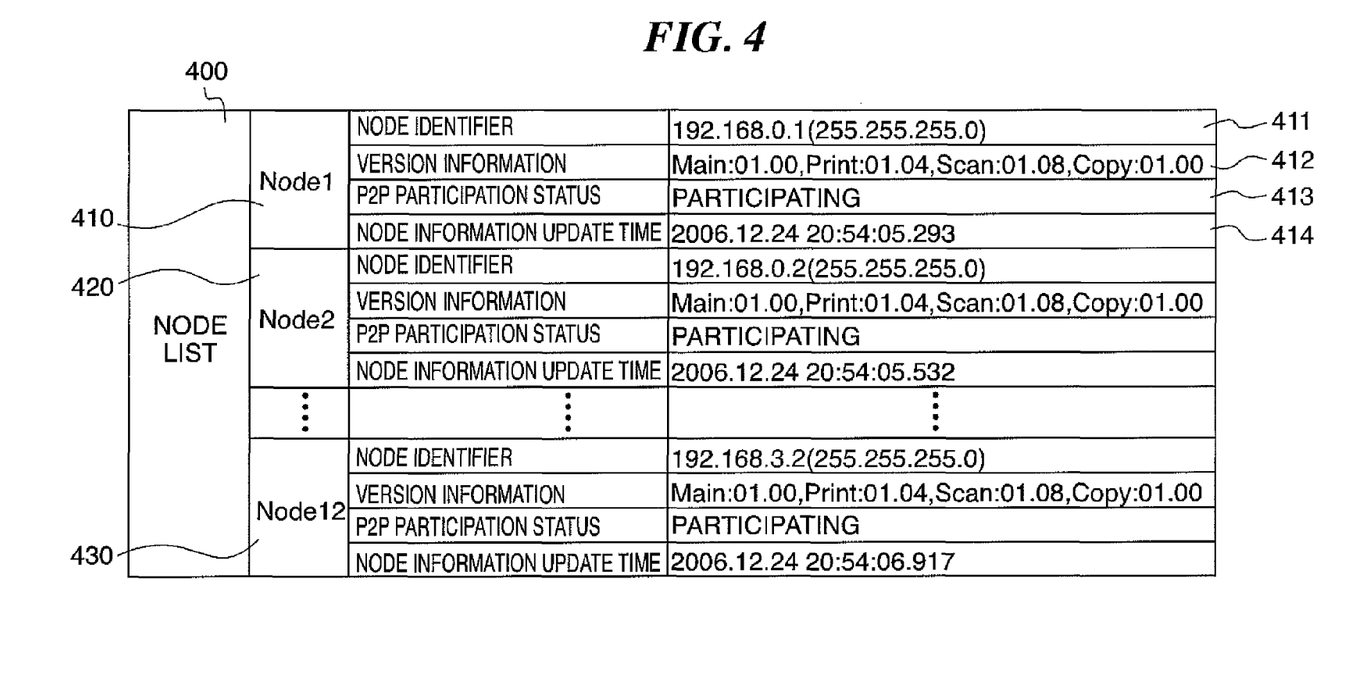
FIG. 4 is a view showing a configuration example of metadata that is regularly exchanged between nodes participating in a P2P network.

FIG. 4 is a view showing a configuration example of metadata that is regularly exchanged between nodes participating in the P2P network.

In FIG. 4, a node list 400 is periodically exchanged between nodes participating in the P2P network using a known P2P communication method (i.e. peer-to-peer communication technology). The node list 400 is respectively held by all the nodes participating in the P2P network, that is, node 1 (2001) to node 12 (2012) with respect to the configuration shown in FIG. 1.

The node list 400 lists information of respective nodes (hereunder, referred to as "node information") with respect to all nodes participating in the P2P network. In FIG. 4, information 410 of node 1 (2001), information 420 of node 2 (2002), and information 430 of node 12 (2012) is extracted and illustrated. The respective pieces of node information comprise a node identifier 411, version information 412, a P2P network participation status 413, and a node information update time 414.

The IP address allocated to the MFP that is the entity of the relevant node shown in FIG. 1 as well as the netmask information thereof is recorded in the node identifier 411. In the version information 412, the version information of a plurality of firmware modules that operate on the MFP that is the entity of the relevant node is listed. Information indicating the following three statuses and the like is recorded in the P2P network participation status 413. The first status is a participating status that indicates that a logical connection by P2P communication is being maintained. The second status is a non-participating status that indicates that a logical connection has been disconnected by turning off the power or the like. The third status is an inactive status that indicates that it is temporarily not possible to perform P2P communication because the MFP of the relevant node has been entered a power saving mode.

The metadata shown in FIG. 4 indicates that node 1, node 2, and node 12 are participating in the P2P network. When each of the nodes shifts its status, such as when the node participates in the P2P network, when the power of the node is turned off, and when the node enters a power saving mode, the node updates only the P2P network participation status 413 relating to itself, and thereafter distributes the node list 400 to an adjacent node.

The node information update time 414 is an area that records a time acquired from an NTP (Network Time Protocol) server or the like upon a node updating an item relating to itself in the node list 400 and distributing the node list 400 to another node. When the node list 400 is distributed by P2P communication, each node compares the node information update time in the node information of the node list that is distributed with the node information update time in the node information of the node list that the node itself is holding. When the node information of the node list that is distributed is found to be new as a result of comparing the two node information update times, the node in question replaces the node information in the node list that the node itself is holding with the node information in the node list that is distributed. Replacement is respectively performed for one or a plurality of node information items in the node list. Thus, the node list that the node itself holds is kept in an up-to-date state.

Figure 5:
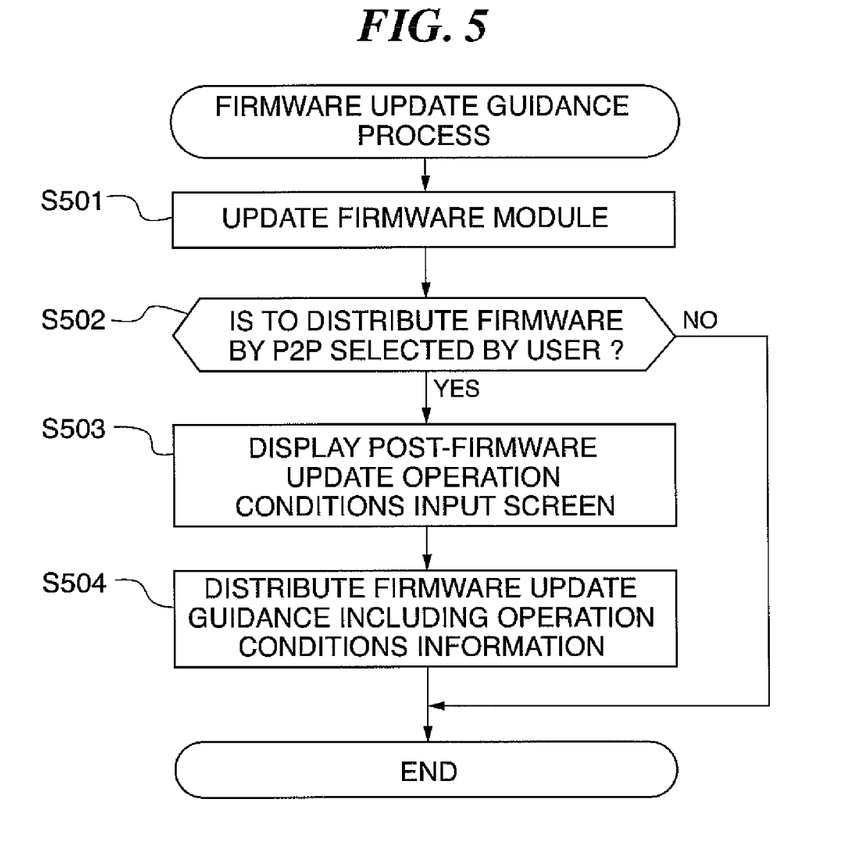
FIG. 5 is a flowchart showing the procedure of a firmware update guidance process.
Figure 6:
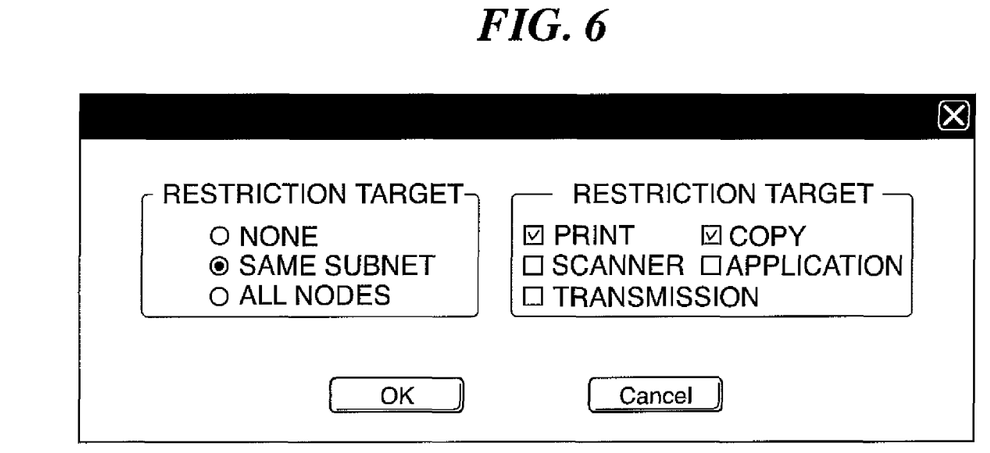
FIG. 6 is a view showing a user interface for setting operation conditions after a firmware update.
Figure 7:
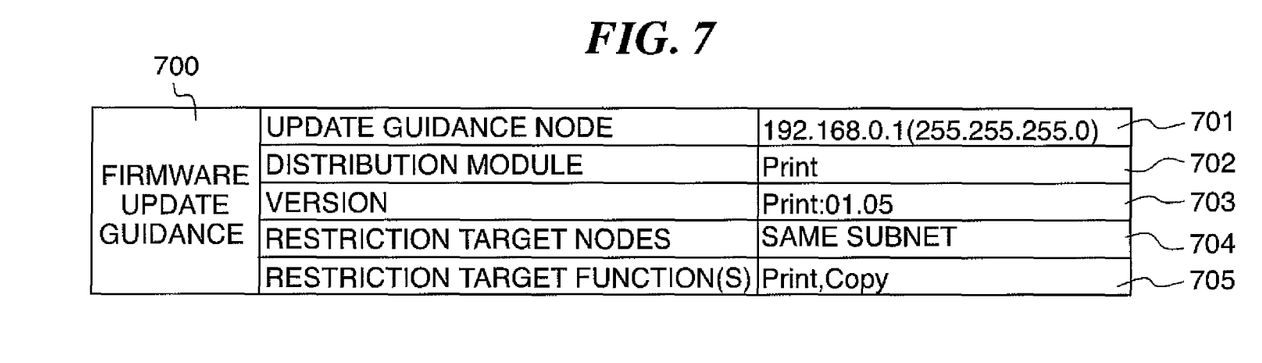
FIG. 7 is a view showing a configuration example of metadata for distributing firmware update guidance to all nodes.

Next, the flow of guidance for updating firmware in the system of the present embodiment is described referring to FIG. 5 to FIG. 7. In this connection, it is assumed that the system according to the present embodiment is a system in which, after an arbitrary firmware module is updated at a single node, the firmware module is distributed to another node by P2P communication.

FIG. 5 is a flowchart showing the procedure of a firmware update guidance process. FIG. 6 is a view showing a user interface for setting operation conditions after a firmware update. FIG. 7 is a view showing a configuration example of metadata for distributing firmware update guidance to all nodes.

In FIG. 5, first the CPU 201 updates a firmware module stored in the RON 202 or the HD 210 inside its own node with a new firmware module (step S501). The new firmware module may be a module that is downloaded via a network or a module that is read from the ROM 202. When updating of the firmware module is completed, the CPU 201 proceeds to step S502. At step 502, the CPU 201 allows the user to select whether or not to distribute the new firmware module to another node by P2P communication, and determines whether or not the user selects to distribute the new firmware module to another node by P2P communication. The CPU 201 displays the instruction "Select whether or not to distribute the new firmware module to another node" to the user through the display 208. If the user selects to distribute the new firmware module, the CPU 201 proceeds to step S503. If the user does not select to distribute the new firmware module, the process is terminated without performing firmware update guidance.

Next, the CPU 201 displays an operation conditions input screen to allow the user to input operation conditions that indicate the manner in which to operate, after the firmware module of the another node is updated, functions provided by the updated firmware module (step S503). More specifically, as shown in FIG. 6, the operation conditions input screen is displayed in the display 208 as a user interface. When the user completes input of the operation conditions and depresses the OK button on the operation conditions input screen, the CPU 201 proceeds to step S504.

On the operation conditions input screen, nodes that are the restriction targets and functions that are the restriction targets are selected by the user. When "same subnet" is selected, until all nodes belonging to the same subnet complete updating the firmware, the nodes belonging to the same subnet must restrict provision of the function(s) specified as the restriction target(s). That is, the condition for releasing the restriction is that all nodes that belong to the same subnet have completed updating the firmware.

Likewise, when "all nodes" is selected, until all nodes belonging to the P2P network complete updating the firmware, the respective nodes belonging to the P2P network must restrict use of the function(s) specified as the restriction target (s). That is, the condition for releasing the restriction is that all nodes that belonging to the P2P network have completed updating the firmware. When "none" is selected, there are none of the above described restrictions.

In FIG. 6, "same subnet" is selected as the nodes that are the restriction target, and "print" and "copy" are selected as the functions that are the restriction target.

The operation conditions to be input are not limited to those shown in FIG. 6, and the operation conditions may be changed for each kind of data to be distributed.

Next, the CPU 201 distributes firmware update guidance metadata, that includes information (hereunder, referred to as "operation conditions information") showing the operation conditions that are input at step S503, to an adjacent node by P2P communication procedures (step S504). Thereafter, the metadata is circulated to all of the other nodes. FIG. 7 shows an example of firmware update guidance metadata. As shown in FIG. 7, firmware update guidance metadata 700 comprises the following items: an update guide node 701, a distribution module 702, a version 703, restriction target nodes 704, and a restriction target function(s) 705.

In the update guide node 701 item, an IP address for identifying the node that distributes the firmware update guidance is recorded. In FIG. 7, the IP address of the node 1 shown in FIG. 1 is recorded. This indicates that node 1 is that node that initially updated the firmware module. The distribution module 702 item shows the kind of firmware module that is updated at node 1. The version 703 item shows the version information of the updated firmware module. In FIG. 7, the version 703 item indicates that the version of the firmware module relating to the print function has been updated to "01.05".

In the restriction target nodes 704 item and the restriction target function(s) 705 item, the conditions input in the screen of FIG. 6 are recorded as they are. In FIG. 7, information indicating "same subnet" that is selected on the screen shown in FIG. 6 is recorded in the restriction target nodes 704 item. Further, information indicating print function and copy function is recorded in the restriction target function(s) 705 item. In contrast, when "none" is selected as the restriction target in FIG. 6, information indicating "none" is recorded in the restriction target nodes 704 item and provision of all functions is permitted as soon as updating of the firmware is completed. Further, when "all nodes" is selected as the restriction target in FIG. 6, information indicating "all nodes" is recorded in the restriction target nodes 704 item and provision of the functions selected as restriction target function (s) is not permitted until all of the nodes satisfy the condition.

Figure 8:
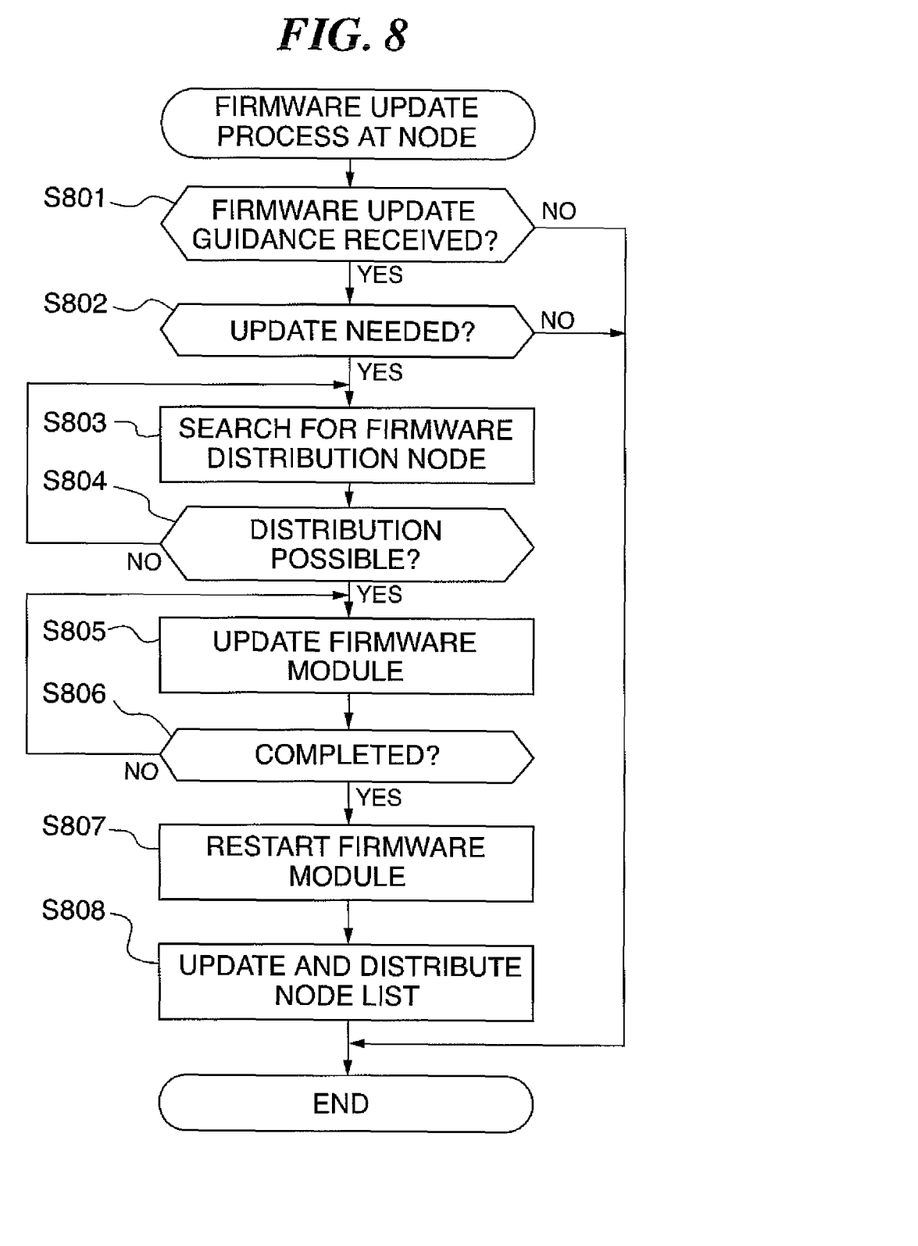
FIG. 8 is a flowchart showing the procedure of a firmware update process at a node.

FIG. 8 is a flowchart showing the procedure of a firmware update process at a node.

In FIG. 8, the CPU 201 determines whether or not firmware update guidance metadata shown in FIG. 7 is received from another node (step S801). When the CPU 201 determines that firmware update guidance metadata is received (Yes at step S801), with respect to the firmware module indicated by the distribution module 702 of the metadata, the CPU 201 compares the version 703 item of the metadata with the version of the firmware module stores in its own node. Based on the comparison result, the CPU 201 determines whether or not it is necessary to update the firmware module in its own node (step S802). If it is necessary to update the firmware module (Yes at step S802), the CPU 201 retrieves a node having the same version of the firmware module as the version recorded in the version 703 item of the firmware update guidance metadata from the node list 400 (step S803). The CPU 201 then sends an inquiry to the node that is retrieved from the node list 400 regarding whether it is possible for that node to distribute the firmware module. Based on the reply to the inquiry, the CPU 201 determines whether or not the distribution from that node is possible (step S804).

The CPU 201 repeats the above steps S803 to S804 until a node that can perform the distribution is found. Once the CPU 201 finds a node that can perform the distribution, the CPU 201 receives the firmware module by P2P communication from that node and updates the firmware module at its own node with the new firmware module that is received (step S805). The CPU 201 then determines whether or not the updating is completed (step S806). The CPU 201 repeats the update processing of step S805 until the updating is completed (No at step S806) When the updating is completed (Yes at step S806), the CPU 201 restarts the firmware module (step S807).

After restarting the firmware module, the CPU 201 updates the version information 412, the P2P network participation status 413, the node information update time 414 and the like in the node information relating to its own node in the node list 400 being held by its own node. When the updating is completed, the CPU 201 distributes the updated node list 400 to an adjacent node from its own node using P2P communication (step S808). Thereafter, the node list 400 is circulated to all the nodes in the P2P network.

Figure 9:
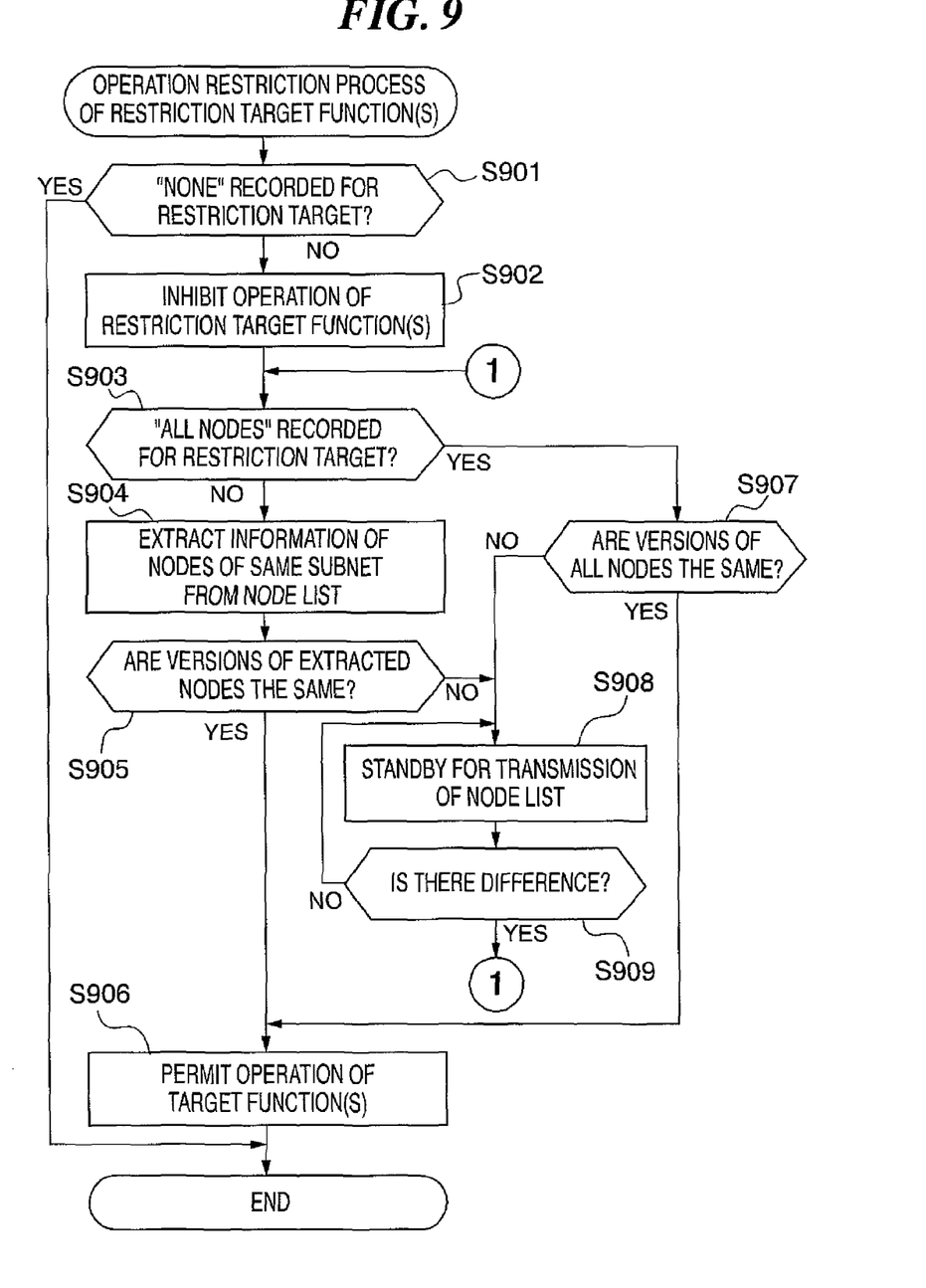
FIG. 9 is a flowchart showing the procedure of an operation restriction process for a target function based on inputs at the user interface.

FIG. 9 is a flowchart showing the procedures of an operation restriction process for a target function based on inputs at the user interface. This process is a process that is executed after the firmware update process shown in FIG. 8 is completed.

In FIG. 9, first, the CPU 201 checks the restriction target nodes 704 recorded in the firmware update guidance metadata 700 shown in FIG. 7 and determines whether or not information indicating "none" is recorded for the restriction target nodes 704 (step S901). When information indicating "none" is recorded in the restriction target nodes 704 item, the process is terminated without restricting any functions. When information indicating "none" is not recorded in the restriction target nodes 704 item, the CPU 201 inhibits the operation of the function(s) recorded in the restriction target function(s) 705 (step S902). For example, if the contents of the restriction target function(s) 705 are as shown in FIG. 6, the CPU 201 inhibits operation of the print function and copy function.

Next, the CPU 201 checks the restriction target nodes 704 again, and determines whether or not information indicating "all nodes" is recorded for the restriction target nodes 704 (step S903). If information indicating "same subnet", and not information indicating "all nodes", is recorded in the restriction target nodes 704 item (No at step S903), the CPU 201 proceeds to step S904. If information indicating "all nodes" is recorded in the restriction target nodes 704 item (Yes at step S903), the CPU 201 proceeds to step S907.

When information indicating "same subnet" is recorded, the CPU 201 checks all the node identifiers 411 in the node list 400 that is being held by its own node, and extracts nodes that belong to the same subnet as its own node based on the IP address of its own node (step S904). Next, the CPU 201 checks the version information 412 of all the nodes that are extracted, and determines whether all the extracted nodes have the same version as its own node of the firmware module updated by its own node (step S905).

When all the extracted nodes have the same version as its own node of the firmware module updated by its own node (Yes at step S905), the CPU 201 permits operation of the restriction target function(s) (step S906). When at least one of the extracted nodes have the different version from its own node of the firmware module updated by its own node (No at step S905), the CPU 201 proceeds to step 5908 and stands by until the node list 400 is newly sent by P2P communication from another node.

When the node list 400 is newly sent by P2P communication from another node, the CPU 201 determines whether or not the node list 400 that is sent is different to the node list 400 that is held by its own node (step S909). When there is a difference between the two node lists (Yes at step S909), the CPU 201 updates the node list 400 that is held by its own node based on the node list 400 that is sent, and then returns to step S903. When there is no difference between the two node lists (No at step S909), the CPU 201 returns to step S908 and stands by for the node list 400 to be newly sent by P2P communication.

In contrast, when information indicating "all nodes" is recorded in the restriction target nodes 704 item (Yes at step 5903), the CPU 201 checks the version information 412 of all the nodes. Next, the CPU 201 determines whether all the extracted nodes have the same version as its own node of the firmware module updated by its own node (step S907). When all the extracted nodes have the same version as the firmware module updated by its own node, the CPU 201 permits operation of the restriction target function(s) (step S906). When at least one of the extracted nodes have the different version from its own node of the firmware module updated by its own node, the CPU 201 proceeds to step S908.

As described above, according to the present embodiment, the MFP 1001 allows the user to input details in the restriction target nodes and the restriction target function(s) after updating the firmware in its own node via the user interface (FIG. 6). Further, as described using the flowchart shown in FIG. 5, the details in the restriction target nodes and the restriction target function(s) are circulated to all nodes using firmware update guidance metadata (FIG. 7). Further, as described using the flowchart of FIG. 8, each node updates the firmware module based on the node list 400 (FIG. 4).

Further, as described using the flowchart shown in FIG. 9, each node restricts the operations of functions based on the node list 400 (FIG. 4). For example, focusing on the MFP 5 (1005), first the firmware update guidance metadata (FIG. 7) is received, and next the Print module is updated. Thereafter, operation of the print function and the copy function is restricted until the version of the Print module of MFP 6 (1006), MFP 7 (1007), and MFP 8 (1008) that are in the same subnet is updated to version 01.05.

As described above, according to the present embodiment, when updating firmware of a plurality of apparatuses together, it is possible to restrict use of firmware distributed to each of a plurality of apparatuses without setting a prescribed time as in the conventional technology.

Second Embodiment

Figure 10:
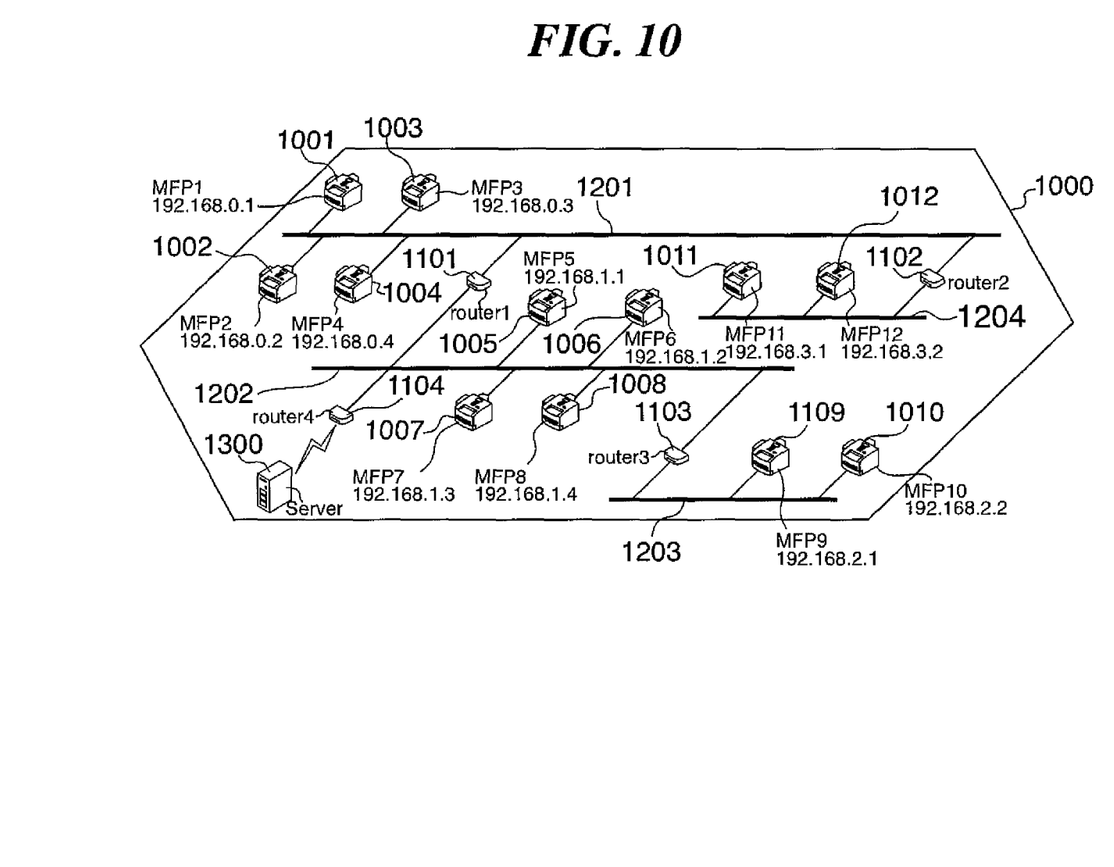
FIG. 10 is a view showing a configuration example in which, in a data processing system according to a second embodiment of the present invention, a logical topology section is deleted from the configuration shown in FIG. 1 and a server is connected via a router.

The second embodiment of the present invention differs from the above described first embodiment in that the second embodiment has the system configuration shown in FIG. 10. The other elements of the present embodiment are the same as the corresponding elements of the first embodiment (FIG. 2, FIG. 3), and a description of these is thus omitted here.

According to the first embodiment, a system was described in which each node exchanges metadata or firmware modules by P2P communication. The present invention is not limited to a system that utilizes P2P communication, and can also be applied to a server/client-type system that contrasts with the P2P model. According to the present embodiment, a server/client-type system is described.

FIG. 10 is a view showing a configuration example in which, in a data processing system according to a second embodiment of the present invention, the logical topology 2000 section is deleted from the configuration shown in FIG. 1 and a server 1300 is connected via a router 4 (1104).

In FIG. 10, a data processing system is configured as a system which connects a plurality of MFPs via a network and which also enable data (firmware module) distribution to a plurality of MFPs from a server device (server 1300). Each MFP is configured to be capable of communication with the server device (server 1300).

The present embodiment is directed at a system in which all firmware modules are distributed to the respective MFPs from the server 1300. The server 1300 holds and manages an MFP list (not shown) in which, with respect to the metadata shown in FIG. 4, MFPs are substituted for nodes and the item for P2P participation status is deleted. Further, each MFP is configured to periodically access the server 1300 and acquire the MFP list.

Further, the server 1300 has the user interface shown in FIG. 6, and is configured to be capable of setting the way in which each MFP is to operate after updating a firmware module. At the server 1300, when setting of operations is completed, the server 1300 generates the firmware update guidance information as shown in FIG. 7. The generated firmware update guidance information is distributed to each MFP from the server 1300 at the same time as the MFP list at the time of periodic access from each MFP.

Figure 11:
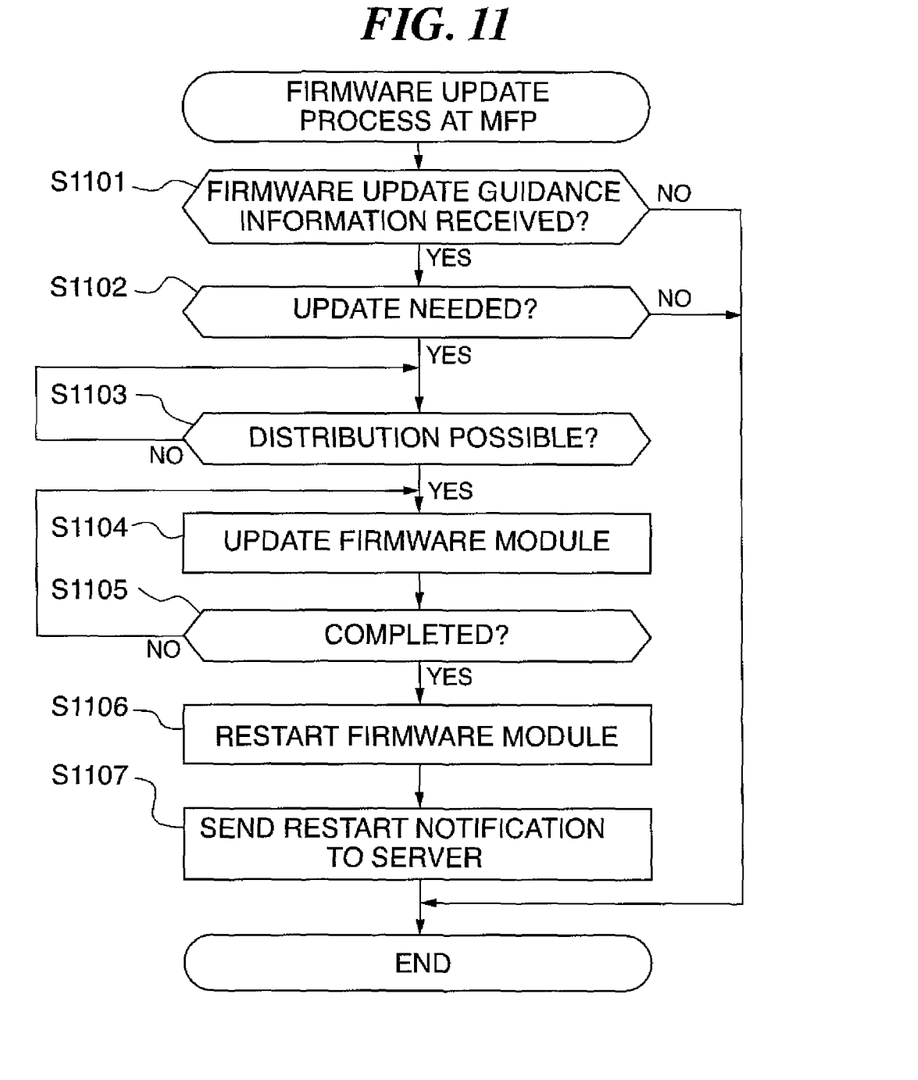
FIG. 11 is a flowchart showing the procedure of a firmware update process at an MFP.

FIG. 11 is a flowchart showing the procedure of a firmware update process at the MFP 1001. Although in the present processing the processing is performed by the MFP 1001, the processing is not limited to the MFP 1001 as long as the processing is performed by one of the MFP configuring the system shown in FIG. 10.

In FIG. 11, the CPU 201 determines whether or not firmware update guidance information is received from the server 1300 (step S1101). When the CPU 201 determines that firmware update guidance information is received from the server 1300 (Yes at step S1101), the CPU 201 performs the following comparison. That is, with respect to the firmware module indicated by the distribution module 702 of the firmware update guidance information, the CPU 201 compares the version 703 of the firmware update guidance information with the version of the firmware module stored in the MFP 1001. Based on the comparison result, the CPU 201 determines whether or not it is necessary to update the firmware module at the MFP 1001 (step S1102).

If it is necessary to update the firmware module (Yes at step S1102), the CPU 201 sends an inquiry to the server 1300 regarding whether the server 1300 can distribute the firmware module. Based on the reply to that inquiry, the CPU 201 determines whether or not distribution from the server 1300 is possible (step S1103). In a case where the server 1300 is busy and cannot distribute the firmware module, the CPU 201 repeats the determination processing of step S1103 until the server 1300 can distribute the firmware module. When it is possible for the server 1300 to distribute the firmware module, the CPU 201 receives the new firmware module from the server 1300 and updates the firmware module of the MFP 1001 with the received firmware module (step S1104).

The CPU 201 then determines whether or not updating is completed (step S1105). The CPU 201 repeats the update processing of step S1104 until the update is completed (No at step S1105). When the update is completed (Yes at step S1105), the CPU 201 restarts the firmware module (step S1106). Upon restarting the firmware module, the CPU 201 notifies the server 1300 to the update (step S1107).

When the server 1300 receives the notification from the MFP 1001, the server 1300 updates the MFP list with the version information relating to the MFP 1001 and the information update time thereof.

Thereafter, the MFP 1001 executes operation restriction processing for the restriction target function(s) in accordance with the flowchart illustrating the operation restriction processing for restriction target function(s) shown in FIG. 9, with the exception that the term "MFP" is substituted for the term "node" in the flowchart shown in FIG. 9. Also, at step S904, the CPU 201 acquires the MFP list from the server 1300 and extracts MFPs belonging to the same subnet as its own MFP based on the IP address of its own MFP. Further, at step S908, the CPU 201 periodically acquires the MFP list from the server 1300.

As described above in detail, it is possible to restrict operation for respective functions even in a server/client-type system as in the present embodiment.

As described above, according to the present embodiment, when updating the firmware of a plurality of apparatuses together, it is possible to restrict use of firmware that is distributed to each of a plurality of apparatuses without setting a prescribed time as in the conventional technology.

Other Embodiments

Although according to the above described first and second embodiments an example was given of a case in which the firmware described in FIG. 3 is configured so that updating and restarting can be performed for each module, the present invention is not limited thereto. The present invention can also be applied to an apparatus for which the entire firmware 300 shown in FIG. 3 must be completely updated and restarted at one time as one block and not in module units.

Further, although an example of updating firmware was given according to the above described first and second embodiments, the present invention is not limited thereto. The present invention can also be applied in the case of updating resources such as font data or in the case of updating an application program that operates on an apparatus. For example, by applying the present invention to a case of updating an application that counts and analyzes charge information in accordance with a number of print sheets, it is possible to avoid differences in charge results due different versions of the applications operating at the same time.

Although according to the above described first and second embodiments an example was given of a case in which "same subnet" is a selection item with respect to a restriction target after updating, the present invention is not limited thereto. The advantages of the present invention can be obtained without any limitation with respect to IP addresses. For example, a configuration may be adopted as follows: firstly a node identifier that is used only on a P2P network is defined, and that identifier recorded in the node identifier 411; secondly, group information that divides nodes into groups using node identifiers is recorded in a node list; and lastly a selection item indicating "node group" is provided on the user interface shown in FIG. 6 and the selected functions are provided only when the nodes belonging to that group fulfill the condition. By adopting the above configuration, the same advantages can be obtained without using IP addresses.

According to the first and second embodiments, a restriction relating to use of a firmware is released at step S906 in accordance with conditions for releasing a restriction relating to the use of the firmware, to thereby permit operation of the target function(s). Instead, however, use of a firmware may be restricted in accordance with conditions that restrict use of the firmware. For example, a condition may be "restrict provision of a function that is a restriction target unless at least one node belonging to the same subnet has completed update of the firmware". Further, a condition may be "restrict usage of a function that is a restriction target unless at least one node belonging to the P2P network has completed update of the firmware".

Further, although according to the foregoing first and second embodiments a data processing system comprising MFPs was taken as an example, the present invention is not limited thereto. The present invention can also be applied to a data processing system comprising printers, and similar advantages can be obtained.

Further, although according to the foregoing first and second embodiments a data processing system comprising image forming apparatuses as MFPs was taken as an example, the present invention is not limited thereto. The present invention can also be applied to a system comprising general-purpose apparatuses such as information processing apparatuses, or a system in which image forming apparatuses and general-purpose apparatuses such as information processing apparatuses are mixed, and similar advantages can be obtained.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present Invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a non-volatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Furthermore, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-130580 filed May 16, 2007, which is hereby incorporated by reference herein in its entirety.

What is claimed is:

1. A data processing apparatus comprising:
a storage unit adapted to store control data for controlling the data processing apparatus;
a reception unit adapted to receive update data for updating the control data;
an updating unit adapted to update the control data at the data processing apparatus based on the update data received by said reception unit;
a determining unit adapted to determine whether or not corresponding control data, which corresponds to the control data stored by the storage unit, but is stored at another data processing apparatus for controlling the another data processing apparatus, is finished updating based on the update data at the another data processing apparatus, which belongs to a same group as the data processing apparatus; and
a control unit adapted to permit execution of a function of the data processing apparatus corresponding to the control data updated by said updating unit in a case where the determining unit determines that the corresponding control data has finished updating at the another data processing apparatus based on the update data, and to restrict the execution of the function of the data processing apparatus in a case where the determining unit determines that the corresponding control data has not finished updating at the another data processing apparatus based on the update data,
wherein said control unit is adapted to restrict the execution of the function of the data processing apparatus corresponding to the updated control data in the case where said determining unit determines that the corresponding control data has not finished updating based on the update data at the another data processing apparatus, even if the control data has finished updating based on the update data at the data processing apparatus,
wherein said determining unit is adapted to determine, based on information received from an external apparatus, whether or not the corresponding control data has finished updating based on the update data at the another data processing apparatus, and
wherein said reception unit is adapted to receive the update data from the external apparatus.

2. The data processing apparatus according to claim 1, wherein:
said control unit is adapted to inhibit the execution of the function of the data processing apparatus corresponding to the updated control data in the case where said determining unit determines that the corresponding control data has not finished updating based on the update data at the another data processing apparatus.

3. The data processing apparatus according to claim 1, wherein:
the another data processing apparatus is a node belonging to a same subnet as a node of the data processing apparatus.

4. The data processing apparatus according to claim 1, wherein:
the another data processing apparatus is a node belonging to a network where the data processing apparatus exists.

5. The data processing apparatus according to claim 1, wherein:
said determining unit is adapted to determine, based on information received from the another data processing apparatus, whether or not the control data has finished updating based on the update data at the another data processing apparatus.

6. The data processing apparatus according to claim 1, wherein each of the control data and the corresponding control data is firmware.

7. A method of controlling a data processing apparatus, the method comprising the steps of:
receiving, by a reception unit of the data processing apparatus, update data for updating control data for controlling the data processing apparatus, the control data stored in a storage unit of the data processing apparatus;
updating, by an updating unit of the data processing apparatus, the control data at the data processing apparatus based on the update data received by said reception unit;
determining, by a determining unit of the data processing apparatus, whether or not corresponding control data, which corresponds to the control data stored by the storage unit, but is stored at another data processing apparatus for controlling the another data processing apparatus, is finished updating based on the update data at the another data processing apparatus, which belongs to a same group as the data processing apparatus; and
controlling, by a control unit of the data processing apparatus, to permit execution of a function of the data processing apparatus corresponding to the control data updated by said updating unit in a case where it is determined by said determining unit that the corresponding control data has finished updating at the another data processing apparatus based on the update data, and to restrict the execution of the function of the data processing apparatus in a case where it is determined by the determining unit that the corresponding control data has not finished updating at the another data processing apparatus based on the update data
wherein said controlling step includes controlling to restrict the execution of the function of the data processing apparatus corresponding to the updated control data in the case where it is determined by the determining unit that the corresponding control data has not finished updating based on the update data at the another data processing apparatus, even if the control data has finished updating based on the update data at the data processing apparatus,
wherein said determining step includes determining, based on information received from an external apparatus, whether or not the corresponding control data has finished updating based on the update data at the another data processing apparatus, and
wherein said receiving step includes receiving the update data from the external apparatus.

8. The method of claim 7, wherein each of the control data and the corresponding control data is firmware.

9. A non-transitory computer-readable storage medium storing instructions configured to be executed by a computer system of a data processing apparatus to control the data processing apparatus, the instructions comprising instructions for:
receiving, by a reception unit of the data processing apparatus, update data for updating control data for controlling the data processing apparatus, the control data stored in a storage unit of the data processing apparatus;
updating, by an updating unit of the data processing apparatus, the control data at the data processing apparatus based on the update data received by said reception unit;
determining, by a determining unit of the data processing apparatus, whether or not corresponding control data, which corresponds to the control data stored by the storage unit, but is stored at another data processing apparatus for controlling the another data processing apparatus, is finished updating based on the update data at the another data processing apparatus, which belongs to a same group as the data processing apparatus; and
controlling, by a control unit of the data processing apparatus, to permit execution of a function of the data processing apparatus corresponding to the control data updated by said updating unit in a case where it is determined by said determining unit that the corresponding control data has finished updating at the another data processing apparatus based on the update data, and to restrict the execution of the function of the data processing apparatus in a case where it is determined by the determining unit the corresponding control data has not finished updating at the another data processing apparatus based on the update data,
wherein said controlling includes controlling to restrict the execution of the function of the data processing apparatus corresponding to the updated control data in the case where it is determined by the determining unit that the corresponding control data has not finished updating based on the update data at the another data processing apparatus, even if the control data has finished updating based on the update data at the data processing apparatus,
wherein said determining step includes determining, based on information received from an external apparatus, whether or not the corresponding control data has finished updating based on the update data at the another data processing apparatus, and
wherein said receiving step includes receiving the update data from the external apparatus.

10. The non-transitory computer-readable storage medium of claim 9, wherein each of the control data and the corresponding control data is firmware.

* * * * *